(12) United States Patent
Walker, Jr.

(10) Patent No.: US 7,598,661 B2
(45) Date of Patent: Oct. 6, 2009

(54) SPARK PLUG

(75) Inventor: William J. Walker, Jr., Toledo, OH (US)

(73) Assignee: Federal-Mogul World Wide, Inc, Southfield, MI (US)

( * ) Notice: Subject to any disclaimer, the term of this patent is extended or adjusted under 35 U.S.C. 154(b) by 68 days.

(21) Appl. No.: 11/745,736

(22) Filed: May 8, 2007

(65) Prior Publication Data

US 2008/0042539 A1    Feb. 21, 2008

Related U.S. Application Data

(60) Provisional application No. 60/815,946, filed on Jun. 23, 2006.

(51) Int. Cl.
*H01T 13/48* (2006.01)
*H01T 13/20* (2006.01)
*C04B 35/00* (2006.01)

(52) U.S. Cl. .................... 313/129; 123/169 E; 501/127

(58) Field of Classification Search .............. 313/118, 313/129, 137, 143; 501/97.2, 127; 123/169 E
See application file for complete search history.

(56) References Cited

U.S. PATENT DOCUMENTS

| | | | |
|---|---|---|---|
| 3,377,176 A * | 4/1968 | Weaver | 264/681 |
| 3,517,247 A | 6/1970 | Szilagyi | |
| 3,754,139 A | 8/1973 | Swithenbank et al. | |
| 3,846,655 A | 11/1974 | Thring | |
| 4,668,646 A * | 5/1987 | Ando et al. | 501/136 |
| 4,949,006 A | 8/1990 | Oshima et al. | |
| 5,922,948 A | 7/1999 | Lesko et al. | |
| 6,239,052 B1 | 5/2001 | Fukushima | |
| 6,265,816 B1 * | 7/2001 | Ito et al. | 313/141 |
| 6,559,579 B2 * | 5/2003 | Ito et al. | 313/143 |
| 2003/0194463 A1 | 10/2003 | Gakovic | |
| 2006/0186780 A1 * | 8/2006 | Ogata et al. | 313/118 |
| 2007/0152557 A1 | 7/2007 | Packard | |

FOREIGN PATENT DOCUMENTS

| | | |
|---|---|---|
| DE | 19600258 A1 | 7/1996 |
| JP | 62187156 A * | 8/1987 |
| WO | WO 2005033041 A1 * | 4/2005 |

\* cited by examiner

*Primary Examiner*—Peter Macchiarolo
(74) *Attorney, Agent, or Firm*—Robert L. Stearns; Dickinson Wright PLLC

(57) ABSTRACT

A spark plug insulator having high dielectric strength, high density, and an optical property that allows the passage of light.

91 Claims, 2 Drawing Sheets

"Prior Art"

SPARK PLUG

CROSS-REFERENCE TO RELATED APPLICATION

This application claims the benefit of U.S. Provisional Application No. 60/815,946, filed Jun. 23, 2006, the entire disclosure of the provisional application being considered part of the disclosure of this application and hereby incorporated by reference.

BACKGROUND OF THE INVENTION

The present invention is directed to a spark plug insulator having high dielectric strength, high density, fine grain, and an optical property that allows the passage of light.

An exemplary spark plug is illustrated in FIG. 1 having an outer shell 20 secured to an insulator 30. A center electrode 50 and terminal 40 are at least partially secured within the insulator 30. The insulator 30 insulates the charged terminal 40 and center electrode 50 from the ground electrode 22. The insulator 30 also separates the terminal 40 and center electrode 50 from outside electrical interferences.

As manufacturers continually increase the complexity and reduce the size of internal combustion engines, there is a strong need for spark plugs that are smaller and occupy less space. Currently, the size of the spark plug, particularly the diameter of the spark plug, is limited from further reduction due to the required dielectric strength of the insulator over the service lifetime of the plug. The dielectric strength is directly related to required thickness for the walls of the insulator. Another factor limiting size reduction is that more manufacturers are demanding a longer service lifetime from spark plugs such as requesting 100,000 mile, 150,000 mile, and 175,000 mile service lifetimes from spark plugs. The longer the desired service lifetime, the higher the required dielectric strength. In the past, the common way to increase the service lifetime or dielectric strength of a spark plug was to increase the thickness of the walls of the insulator. However, the current demand for more compact spark plugs for modern engines prevents or limits the use of thicker walled insulators.

The recent movement to electromechanical valve actuators in place of cam shafts to improve fuel efficiency and power is also expected to further increase the demand for thinner and smaller spark plugs. The demand for higher dielectric strength is also being driven by recent developments and trends in modern internal combustion engines. To improve fuel economy and increase performance, engines are being designed with higher compression and turbocharged engines are becoming more common. To make a spark jump the spark gap under higher compression requires higher voltage and therefore higher dielectric strength in an insulator. Therefore, an insulator for a spark plug having increased dielectric strength while having reduced wall thickness and size is needed.

Modern spark plugs are typically formed from an alumina composition with other proprietary additives unique to a particular spark plug manufacturer. When formed, the alumina with the proprietary components typically forms a ceramic insulator that is white and not transparent. In fact the inventors are not aware of any current spark plugs where the insulator allows transmission of light so that the insulator visibly shows the spark within the combustion chamber under normal illumination, much less in sunlight. While some past insulators formed from an amorphous material, such as glass, were transparent, these insulators do not meet the dielectric strength required by modern internal combustion engines, and especially the current size requirements as a much greater wall thickness of these prior transparent insulators was required even under reduced dielectric strength requirements. In diagnosing various engine problems, it would be desirable to see in the cylinder or at a minimum see the combustion to determine if there is a problem with the spark occurring in a cylinder. Currently, to determine if there is a problem with the electrical ignition, spark plug wires, or spark plugs on a vehicle, special tests are required. Therefore, it is desirable to see the spark occur in the combustion chamber of the cylinder while yet retaining a spark plug having high dielectric strength and desirable mechanical qualities, including the diameter of the insulator.

The insulator 30 is traditionally fired and glazed to provide a smooth surface on the terminal portion 12 of the insulator 30. Glazing is required to prevent flash-over which may occur on unglazed insulators 30 on the terminal portion 12. To reduce manufacturing costs and time, it is desirable to not glaze the insulators, however, currently, without additional processing steps, the outer surface of the insulator cannot be made with the required smoothness to prevent flash-over and therefore must be glazed.

The firing end portion or core nose 14 of the insulator 30 is typically not glazed due to the expense of the glazing process, as flash-over is generally not a problem for this portion of the spark plug. Therefore, the firing end portion or core nose of the insulator 30 traditionally has a rough surface that may attract deposits from the combustion process in the cylinder, which may detrimentally affect firing of the spark plug. In engines that are not correctly tuned, are not operating efficiently, or have mechanical problems such as oil leakage into the cylinder during the combustion process, these deposits can quickly and significantly build up to eventually create an electrical conduit between the center electrode 50 and the shell 20 of lower resistance then jumping the spark plug gap, which in turn prevent the spark plug from providing the proper sparking profile to efficiently ignite the gases in the cylinder. Two-cycle engines may also build up deposits due to the oil present in the cylinder during combustion. Therefore, it is desirable to develop a material for use as a spark plug insulator that has a smoother surface that does not require glazing or other finishing processes.

SUMMARY OF THE INVENTION

The present invention is directed to a spark plug insulator having a high dielectric strength, excellent mechanical properties, and optical properties that allow the passage of light from the firing end of the spark plug to the terminal portion. It has been found that: (1) a somewhat transparent insulator for spark plug which allows showing of the sparking and combustion process in the chamber through transmission of light, and (2) an insulator for a spark plug having high dielectric strength and excellent mechanical properties which allow a thinner spark plug may be created through using a material to form the insulator that is at least 99% polycrystalline $Al_2O_3$ with other trace materials and metal oxides. To form such high purity $Al_2O_3$ insulators, the metal oxides act as a sintering aid and a grain growth inhibitor.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
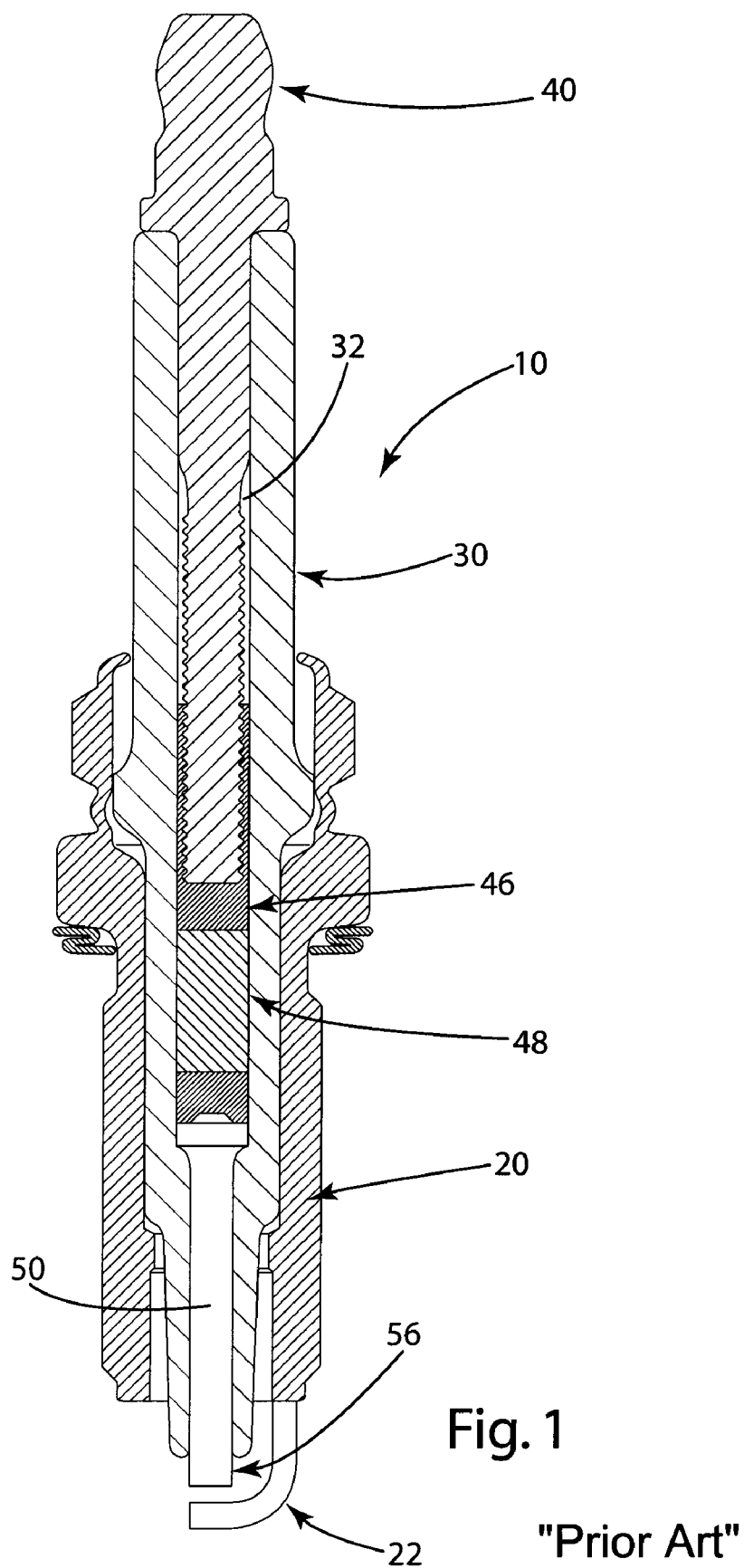
FIG. 1 is a sectional view of a typical spark plug.
Figure 2:
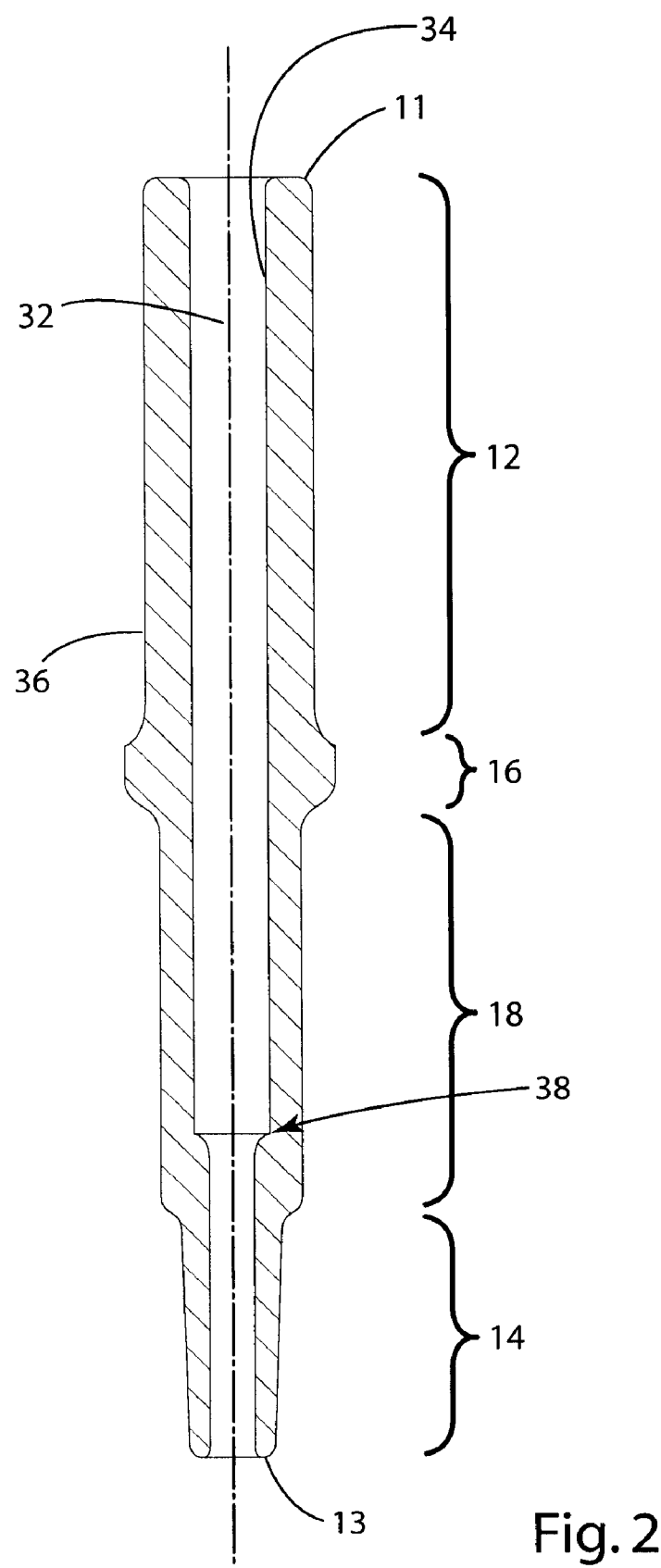
FIG. 2 is a sectional view of the insulator portion of the spark plug in FIG. 1.

A spark plug 10 is illustrated in a sectional view in FIG. 1. The spark plug 10 includes an outer shell 20 secured to an insulator 30, said outer shell 20 includes a ground electrode 22. While the spark plug 10 is illustrated as having a central bore 32 on the insulator 30 in which is situated a terminal 40, a conductive material 46, a seal material 48, and a center electrode 50, any configuration of spark plug, or igniter having an insulator may use the insulator 30 of the present invention. The references to spark plug and spark plug insulator also generally refer to igniters and insulators for igniting. The center electrode 50 includes a tip 56 facing the ground electrode 22. As is further illustrated in FIG. 2, the insulator 30 extends between a firing end 13 and a terminal end 11. From the terminal end 11 and extending toward the firing end 13, the spark plug insulator 30 includes a terminal portion 12, a large shoulder 16, a small shoulder 18, and a firing end portion or core nose 14. The insulator 30 is further formed with varying wall thicknesses between the inner surface 34 of the central bore 32 and the outer surface 36. The inner surface 34 also defines a counterbore seat 38 against which the center electrode 50 rests. While the spark plug insulator illustrated in the figures and described herein is a typical spark plug used in internal combustion engine, such as for use in an automobile engine, one skilled in the art would readily recognize that the insulator 30 may be formed in a variety of shapes, sizes, and configurations depending on the desired application. For example, in some embodiments, the shoulders 16 and 18 may be missing.

The insulator 30 is formed from a material having approximately at least 99% by weight $Al_2O_3$ and, more preferably, at least 99.4% $Al_2O_3$ by weight. The desirable characteristics of the insulator 30 may also be obtained by forming the insulator 30 from approximately 99.97% or greater than $Al_2O_3$ by weight. To improve the sintering process as well as improve the electrical and mechanical properties, and durability of the spark plug, the spark plug insulator 30 is made from a material containing one or more of various metal oxides such as the oxides of Group IIIB transition metals, the oxides of the Lanthanide Series, and MgO. These metal oxides are typically present individually or in combination in the amounts of up to approximately 1,000 ppm. Depending on the desired characteristics, the metal oxides may be present in the amount of approximately 50 to 675 ppm and, in some instances, between 100 to 600 ppm. Exemplary metal oxides include $Y_2O_3$, $La_2O_3$, $Yb_2O_3$, and MgO. Exemplary transition metal oxides selected from Group IIIB include $Se_2O_3$, $Y_2O_3$, and $La_2O_3$. Exemplary oxides of the Lanthanide Series include metal oxides selected from the group of oxides containing the oxides of La, Ce, Pr, Nd, Pm, Sm, Eu, Gd, Th, Dy, Ho, Er, Tm, Yb, and Lu. Table 1 below provides Examples 1-8 showing the composition of exemplary insulators and in particular, the amount of $Al_2O_3$, MgO, and other metal oxides included in the insulator.

TABLE 1

| ID | $Al_2O_3$ | MgO | Metal Oxides |
|---|---|---|---|
| 1 | >99.99% | 300 ppm | |
| 2 | 99.94% | 300 ppm | |
| 3 | 99.9% | 120 ppm | |
| 4 | 99.97% | 535 ppm | |
| 5 | >99.9% | | 100–500 ppm $Y_2O_3$ |
| 6 | >99.9% | | 100–500 ppm $La_2O_3$ |
| 7 | >99.9% | | 100–500 ppm $Yb_2O_3$ |
| 8 | >99.9% | 100–500 ppm MgO+ | 100–500 ppm $Y_2O_3$ |

As the metal oxides are present during the firing of the $Al_2O_3$ insulator, the insulator may include metal oxides with aluminum in some examples. For example, the chemical composition of the metal oxide may be $M_3Al_5O_{12}$ where M is from the group comprising Se, Y, La, Ce, Pr, Nd, Pm, Sm, Eu, Gd, Tb, Dy, Ho, Er, Tm, Yb, and Lu. More generally, the metal oxides may be of the chemical composition $M_xAl_yO_z$ where M is the same as the group listed above and x is greater than or equal to 1, y is greater than or equal to 1 but less than or equal to 2, and z is greater than or equal to 3 but less than or equal to 4. The Aluminum joins the metal oxide from the $Al_2O_3$ due to the high percentage of $Al_2O_3$ relative to the metal oxides and any other impurities.

It has been found that an insulator 30 formed in accordance with the materials listed above has a dielectric strength of equal to or at least 17 kV (RMS) per millimeter when measured using a 60 Hz alternating voltage current source with a full sinusoidal wave form on a specimen that is 1.27 mm thick. To allow the spark plug to be thinner by reducing the thickness of the insulator, it is desirable for the dielectric strength to be at least 17 kV and more preferably 17.5 kV (RMS) per millimeter when used using a 60 Hz alternating voltage current source with a full sinusoidal wave form on a specimen 1.27 mm thick. The increase in dielectric strength allows a reduction of the thickness between the inner surface 34 and outer surface 36 on the insulator 30 and thereby allows the insulator 30 to be made smaller with thinner walls. A smaller insulator creates a smaller spark plug thereby allowing space for more components surrounding the spark plug. A high dielectric strength also provides a longer service lifetime.

The insulator 30 of a spark plug 10 made with the above listed materials also has the desirable property of being either translucent or transparent. The $Al_2O_3$ in the spark plug forms a polycrystalline structure which is different than the previous amorphous structure of glass insulators which could be transparent. While some spark plugs have been made previously of glass which allows the transference of light from one end to the other, as modern spark plugs have moved away from glass to ceramic materials to increase dielectric strength and reduce size, the insulators have been a shade of white and are not transparent. A spark plug insulator 30 formed of the materials listed above, allows for the transmission of light from the firing end 13 to the terminal end 11 or terminal portion 12. The material of the spark plug insulator 30 has been selected to provide an optical transmission of approximately 50% or greater for a specimen 1 mm thick. It has been found that an insulator 30 made of the materials described above may have an optical transmission rate of greater than 80% for a specimen 1 mm thick. While an 80%+ transmission rate is not necessary, the greater the optical transmission, the easier it is to see the spark and combustion within the combustion chamber. Applicants have found that to produce the desired transmission of light from the core nose portion 14 to the terminal portion 12, it is desirable that the optical transmission rate of the insulator is greater than or equal to 50% for a specimen 1 mm thick. Of course, using the materials listed above much greater optical transmission rates may be obtained. Depending on the materials selected, the polycrystalline insulator 30 may have a transparent, opaque or translucent quality.

Porosity is known to have an effect on optical transmission. Conventional spark plug insulators made from 95% alumina ceramic compositions contain about 4% porosity and have optical transmission of about 5% or less for specimens with thickness of 1 mm, making the alumina ceramic white and opaque. When spark plug insulators are made from high purity alumina (more than 99.5% alumina) and contain 0.3% porosity, the optical transmission remains at about 5% or less and the material is opaque. Significant increases in the optical transmission of alumina ceramics require porosity to be 0.1% or lower. Spark plug insulators made in accordance with the present invention have polycrystalline alumina with 99.9% purity and less than 0.1% porosity, which gives an optical transmission of over 80% for specimens with thickness of 1 mm.

The grain size also influences the optical transmission and in particular the in-line optical transmission. The interfaces between the grains in the sintered alumina cause scattering of transmitted light. This is because alumina is a birefringent material—the refractive index of alumina is different depending on the crystallographic orientation. Since the grains of alumina in an insulator will be somewhat randomly aligned, light will be scattered as it passes from one grain to another. This impacts the in-line optical transmission. While two samples of alumina may have identical optical transmission, a sample with higher in-line optical transmission will show a clearer image through the material. In comparison, a clear glass window has high in-line optical transmission, while a frosted glass window has low in-line optical transmission. The in-line optical transmission of alumina is increased as the grain size is decreased. For alumina with grain size of 5 microns, in-line optical transmission will typically be less than 5%. For grain size of 2 microns, in-line optical transmission can be as high as 20%, but as in the present invention, the in-line optical transmission is approximately 50% with a grain size of less than 1 micron.

For some applications of spark plugs, a high degree of in-line optical transmission may be desirable. For example, it may be desirable to obtain a clear image of the spark and subsequent development of the combustion front in the engine cylinder. In other cases, a low degree of in-line optical transmission may be preferred. For example, it may be desirable to detect the light from the spark and combustion, but unappealing aesthetically to the customer to see the internal components of the spark plug, such as the glass seal and terminal. In this case, a low in-line optical transmission would be preferred. Therefore, the present invention may modify the optical transmission through modification of the grain size and may have a low in-line optical transmission, such as 20% or even as low as 5%.

The above materials are selected to also have high mechanical strength when sintered by having a grain size of approximately equal to less than 30 microns. Mechanical strength is higher for material with finer grain size. For example, an insulator with grain size of 30 microns generally has a mechanical strength of about 350 megapascals, while an insulator with grain size of 10 microns has mechanical strength of about 450 megapascals, and when grain size is less than 1 micron, mechanical strength can exceed 600 megapascals.

The above selected materials also allow the spark plug insulator 30 to be formed with a surface that does not require glazing. The surface formed when the insulator 30 is made with the above materials in the listed quantities, has an average roughness of 0.40 μm or less without additional processing steps, such as glazing. A typical unglazed prior art insulator has an average roughness of 1.6 μm or more which may cause dirt or other contaminants to adhere to the surface of the insulator on the terminal end which promotes flash over the electric spark from the terminal to the shell. Therefore, current insulators always require glazing to prevent dirt or other contaminants from adhering. The outer surface 36 of the insulator 30 of the present invention has the unexpected benefit of an average roughness of approximately 0.40 μm or less which eliminates the need for glazing the spark plug and reduces the possibility of undesirable flash-over. It has also been found that using the materials selected above in the quantities listed, a spark plug comprising an unglazed insulator may have an average outer surface roughness of 0.20 μm or less thereby even further preventing flash over.

An insulator made in accordance with the materials listed above and with the quantity listed has a high dielectric strength and a high mechanical strength. This allows the spark plug insulator to be formed with a thickness between the outer surface 36 and the inner surface 34 in the small shoulder portion 18 of approximately equal to less than 2.54 mm. Furthermore, it has been found that spark plugs may be formed with sufficient dielectric strength having a thickness of approximately equal to or less than 1.9 mm thickness between the inner surface 34 and outer surface 36 and more surprising that the thickness may be reduced to approximately equal to or less than 1.3 mm thickness while maintaining sufficient dielectric strength and mechanical strength under current requirements.

The spark plug may be formed in a traditional manner that is well known in the art. In particular, the insulator 30 of the spark plug is formed by first preparing a suspension of alumina powder with particle size of about 0.4 microns or less, and other additives in water. These additives include inorganic dopants such as $MgO$, $Y_2O_3$, $MgAl_2O_4$, and the other above listed materials, and organic binders such as polyvinyl alcohol, polyethylene glycol and acrylic emulsion. The suspension is then spray dried to produce a free flowing powder with average granule size of between 50 and 100 microns. This spray dried powder is then isostatically pressed in a die at a pressure of about 200 megapascals to form a press blank. The outer surface of the press blank is shaped using an abrasive grinding wheel to form the desired outer profile of the insulator. The insulator 30 is then fired to temperature of between 1450 and 1800 degrees Celsius to sinter the powder into a dense, homogeneous body. It may be desirable to fire in a vacuum or a controlled atmosphere, such as oxygen or hydrogen in order achieve a highly dense, substantially pore free ceramic. The process of forming the insulator is similar to traditional methods but uses different starting materials, higher pressing pressure, and different firing conditions.

Other methods may be used to form the ceramic insulator. For example, the powder may be dispersed into the slurry by means of a high energy mill such as a vibratory mill or attrition mill using high purity milling media to avoid contamination. A ball mill could also be used provided it had high purity milling media. For conventional spark plugs, a ball mill is used and the milling media is of similar composition to the insulator material, i.e. 90% to 95% alumina. However, to obtain the high purity, low porosity insulator, it is desirable to filter or otherwise remove oversized particle from the suspension. Suspensions for conventional spark plugs are screened through a 45 to 53 micron sieve. To obtain the transparent alumina of the present invention, it may be desirable to use a fiber filter to remove particles over 10 microns. Another method to remove large particles is to allow them to settle out of the suspension under the force of gravity.

The firing process may also be modified, for example, during the early stages of the firing process of a traditional insulator, the binder is removed by thermal methods, however, in the transparent alumina of the present invention, it may be desirable to conduct this thermal process for binder removal in a different atmosphere than the subsequent high temperature sintering process. More specifically, it may be desirable to remove the binder in an inert atmosphere such as argon or nitrogen to avoid the formation of stable carbon compounds that may form as a result of the combustion of the binder and may persist into the final ceramic, and reduce the optical transmission of the insulator. The insulators may also be formed by other methods known to those skilled in the art such as injection molding or extrusion.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A spark plug comprising:
an insulator having a density of approximately greater than or equal to 3.95 g/cm$^3$, and
wherein said insulator is formed from at least 99.7% $Al_2O_3$ and approximately 10-1000 ppm each of at least two materials selected from the group consisting of $Y_2O_3$, MgO, $La_2O_3$ transition metal oxides and oxides of the Lanthanide Series and wherein said insulator has a porosity of 0.3% or less.

2. A spark plug comprising:
an insulator including at least 99% by weight $Al_2O_3$ and having a density of 3.95 g/cm$^3$ or greater and wherein said insulator includes 10-1000 ppm $La_2O_3$, and approximately 10-1000 ppm of at least one selected from the group consisting of $Yb_2O_3$, MgO, transition metal oxides from Group III B of the periodic table, and oxides of the Lanthanide Series.

3. The spark plug of claim 2 wherein said insulator includes approximately 99.9% by weight $Al_2O_3$.

4. The spark plug of claim 3 wherein said insulator contains less than 1000 ppm $Y_2O_3$.

5. The spark plug of claim 4 wherein said insulator contains approximately less than 500 ppm $Y_2O_3$.

6. The spark plug of claim 3 wherein said insulator contains greater than 10 ppm $Y_2O_3$.

7. The spark plug of claim 6 wherein said insulator contains greater than approximately 100 ppm $Y_2O_3$.

8. The spark plug of claim 3 wherein said insulator contains less than 1000 ppm of $La_2O_3$, $Y_2O_3$, MgO and the oxides of the Lanthanide Series.

9. The spark plug of claim 8 wherein said insulator contains approximately less than 500 ppm $La_2O_3$.

10. The spark plug of claim 3 wherein said insulator contains greater than 10 ppm $La_2O_3$ and greater than 10 ppm of MgO.

11. The spark plug of claim 10 wherein said insulator contains greater than approximately 100 ppm $La_2O_3$.

12. The spark plug of claim 3 wherein said insulator contains 10-1000 ppm $Yb_2O_3$.

13. The spark plug of claim 12 wherein said insulator contains approximately less than 500 ppm $Yb_2O_3$.

14. The spark plug of claim 3 wherein said insulator contains greater than 10 ppm $Yb_2O_3$ and greater than 10 ppm of an oxide from the Lanthanide Series.

15. The spark plug of claim 12 wherein said insulator contains greater than approximately 100 ppm $Yb_2O_3$.

16. The spark plug of claim 3 wherein said insulator contains 10-1000 ppm MgO.

17. The spark plug of claim 16 wherein said insulator contains approximately less than 500 ppm MgO.

18. The spark plug of claim 3 wherein said insulator contains greater than 10 ppm MgO, and greater than 10 ppm of an oxide of the Lanthanide Series.

19. The spark plug of claim 16 wherein said insulator contains greater than approximately 100 ppm MgO.

20. The spark plug of claim 3 wherein said insulator includes 10-1000 ppm MgO and 10-1000 ppm $Y_2O_3$.

21. The spark plug of claim 20 wherein said insulator includes approximately less than 500 ppm MgO and approximately less than 500 ppm $Y_2O_3$.

22. The spark plug of claim 21 wherein said insulator includes greater than 10 ppm MgO, greater than 10 ppm $Y_2O_3$ and greater than 10 ppm of an oxide of the Lanthanide Series.

23. The spark plug of claim 21 wherein said insulator includes approximately greater than 100 ppm MgO and approximately greater than 10 ppm $Y_2O_3$.

24. The spark plug of claim 2 wherein said insulator includes approximately 99.94% by weight $Al_2O_3$.

25. The spark plug of claim 24 wherein said insulator includes approximately 100-500 ppm MgO.

26. The spark plug of claim 25 wherein said insulator includes approximately 300 ppm MgO.

27. The spark plug of claim 2 wherein said insulator includes approximately 99.97% by weight $Al_2O_3$.

28. The spark plug of claim 27 wherein said insulator includes approximately 100-500 ppm MgO.

29. The spark plug of claim 27 wherein said insulator includes approximately 300 ppm MgO.

30. The spark plug of claim 27 wherein said insulator includes approximately 120 ppm MgO.

31. The spark plug of claim 2 wherein said insulator includes approximately 99.99% by weight $Al_2O_3$.

32. The spark plug of claim 2 wherein said insulator further includes approximately 50-1000 ppm metal oxides selected from the group comprising MgO, transition metal oxides and oxides of the Lanthanide series.

33. The spark plug of claim 2 wherein said insulator further includes approximately 100-600 ppm metal oxides selected from the group comprising MgO, transition metal oxides and oxides of the Lanthanide series.

34. The spark plug of claim 32 wherein said insulator further includes approximately 50-1000 ppm metal oxides selected from the group consisting essentially of MgO, transition metal oxides and oxides of the Lanthanide series.

35. The spark plug of claim 33 wherein said insulator further includes approximately 100-600 ppm metal oxides selected from the group consisting essentially of MgO, transition metal oxides and oxides of the Lanthanide series.

36. The spark plug of claim 34 wherein said insulator further includes approximately 50-1000 ppm metal oxides selected from the group consisting of MgO, transition metal oxides and oxides of the Lanthanide series.

37. The spark plug of claim 35 wherein said insulator further includes approximately 100-600 ppm metal oxides selected from the group consisting of MgO, transition metal oxides and oxides of the Lanthanide series.

38. The spark plug of claim 32 wherein said transition metal oxides are selected from metal oxides of Group IIIB of the periodic table.

39. The spark plug of claim 32 wherein said transition metal oxides are selected from the group comprising $Sc_2O_3$, $Y_2O_3$, and $La_2O_3$.

40. The spark plug of claim 32 wherein said transition metal oxides are selected from the group consisting essentially of $Sc_2O_3$, $Y_2O_3$, and $La_2O_3$.

41. The spark plug of claim 32 wherein said transition metal oxides are selected from the group consisting of $Sc_2O_3$, $Y_2O_3$, and $La_2O_3$.

42. The spark plug of claim 32 wherein said oxides of the Lanthanide Series are selected from the group of oxides comprising the oxides of La, Ce, Pr, Nd, Pm, Sm, Eu, Gd, Tb, Dy, Ho, Er, Tm, Yb, and Lu.

43. The spark plug of claim 32 wherein said oxides further include aluminum.

44. The spark plug of claim 43 wherein said oxides including aluminum include $MgAl_2O_4$ and $M_3Al_5O_{12}$ where M is selected from the group comprising Sc, Y, La, Ce, Pr, Nd, Pm, Sm, Eu, Gd, Tb, Dy, Ho, Er, Tm, Yb, and Lu.

45. The spark plug of claim 43 wherein said oxides including aluminum include $MgAl_2O_4$ and $M_xAl_yO_z$ where M is selected from the group comprising Sc, Y, La, Ce, Pr, Nd, Pm, Sm, Eu, Gd, Tb, Dy, Ho, Er, Tm, Yb, and Lu, and x is greater than or equal to 1, y is greater than or equal to 1, but less than or equal to 2 and z is greater than or equal to 3, but less than or equal to 4.

46. The spark plug of claim 2 wherein said insulator has a dielectric strength of at least 17 kilovolts (RMS) per millimeter.

47. The spark plug of claim 2 wherein said insulator has a dielectric strength of approximately greater than 17.5 kilovolts (RMS) per millimeter.

48. The spark plug of claim 2 wherein said insulator is transparent or translucent.

49. The spark plug of claim 2 wherein said insulator allows the passage of light from a core nose portion to a terminal portion.

50. The spark plug of claim 2 wherein said insulator is unglazed.

51. The spark plug of claim 50 wherein said unglazed insulator is sufficiently resistant to flash-over.

52. A spark plug comprising a polycrystalline insulator having a core nose and a terminal portion and wherein said insulator is capable of allowing passage of light from said core nose to said terminal portion, and wherein said insulator has a porosity of 0.3% or less and includes greater than 99.9% alumina and at least one material selected from the group consisting of MgO, $Y_2O_3$, $La_2O_3$ and oxides of the Lanthanide series, and a density of 3.96 g/cm$^3$ or greater.

53. A spark plug of claim 52 comprising a translucent polycrystalline insulator.

54. The spark plug of claim 52 wherein said insulator includes a large shoulder and a small shoulder between said core nose and said terminal portion and wherein the thickness of the insulator at said small shoulder portion is less than 2.54 mm.

55. The spark plug of claim 52 wherein said insulator has a grain size of approximately less than 30 microns.

56. The spark plug of claim 52 wherein said insulator has an optical transmission rate of greater than 50% per millimeter in the visible light range.

57. The spark plug of claim 56 wherein said insulator has an optical transmission rate of greater than 70% per millimeter in the visible light range.

58. The spark plug of claim 56 wherein said insulator has an optical transmission rate of greater than 80% per millimeter in the visible light range.

59. The spark plug of claim 52 wherein said insulator has a grain size of approximately less than 20 microns.

60. The spark plug of claim 52 wherein said insulator has a grain size of approximately less than 10 microns.

61. The spark plug of claim 52 wherein said insulator has a grain size of approximately less than 5 microns.

62. The spark plug of claim 52 wherein said insulator has a grain size of approximately less than 2 microns.

63. The spark plug of claim 62 wherein said insulator has an in-line optical transmission of greater than 15%.

64. The spark plug of claim 52 wherein said insulator has a grain size of approximately 1 micron.

65. The spark plug of claim 64 wherein said insulator has an in-line optical transmission of greater than 40%.

66. A spark plug comprising an unglazed insulator, wherein said insulator has an outer surface and said outer surface has an average roughness of 0.40 micrometers or less, and a density of 3.95 g/cm$^3$ or greater, a dielectric strength of approximately 17 kilovolts (RMS) per millimeter, and wherein said insulator is capable of allowing the passage of light.

67. The spark plug of claim 66 wherein said insulator has a grain size of approximately less than 30 microns.

68. The spark plug of claim 66 wherein said insulator has a grain size of less than or equal to approximately 15 microns.

69. The spark plug of claim 66 wherein said insulator has a grain size of less than or equal to approximately 5 microns.

70. The spark plug of claim 69 wherein said insulator has an in-line optical transmission of greater than 5%.

71. The spark plug of claim 70 wherein said insulator has an in-line optical transmission of greater than or equal to 20%.

72. The spark plug of claim 71 wherein said insulator has a grain size is approximately less than or equal to 2 microns.

73. The spark plug of claim 72 wherein said insulator has an in-line optical light transmission of greater or equal to approximately 50%.

74. The spark plug of claim 73 wherein said insulator has a grain size of less than or equal to approximately 1 micron.

75. The spark plug of claim 52 wherein said insulator has a porosity of less than or equal to approximately 0.1%.

76. A spark plug comprising an insulator includes a large shoulder and a small shoulder between said core nose and a terminal portion and wherein the thickness of the insulator at said small shoulder portion is less than 2.54 mm, and a dielectric strength of 17 kilovolts (RMS) or greater per millimeter.

77. The spark plug of claim 76 wherein said thickness is approximately less than or equal to 1.9 mm.

78. The spark plug of claim 76 wherein said thickness is approximately less than or equal to 1.3 mm.

79. The spark plug of claim 76 wherein said insulator has a porosity of less than or equal to approximately 0.3%.

80. The spark plug of claim 79 wherein said insulator has a light transmission of greater than 5% per millimeter.

81. The spark plug of claim 76 wherein said insulator has a porosity of less than or equal to approximately 0.1%.

82. The spark plug of claim 81 wherein said insulator has light transmission of greater than 40% per millimeter.

83. The spark plug of claim 81 wherein said insulator has light transmission of greater than 60% per millimeter.

84. The spark plug of claim 81 wherein said insulator has light transmission of greater than 75% per millimeter.

85. The spark plug of claim 81 wherein said insulator has light transmission of greater than 80% per millimeter.

86. A spark plug comprising an unglazed insulator, wherein said insulator has an outer surface and said outer surface has an average roughness of 0.20 micrometers or less, a density of 3.95 g/cm$^3$ or greater, a porosity of 0.3% or less and is capable of allowing the transmission of light.

87. The spark plug of claim 1 wherein said insulator has an outer unglazed surface with a roughness of 0.20 micrometers or less.

88. The spark plug of claim 1 wherein said insulator has a grain size of less than or equal to 1 micron.

89. The spark plug of claim 1 wherein said insulator has a porosity of approximately 0.1% or less.

90. The spark plug of claim 52 wherein said insulator has a dielectric strength of 17.5 kilovolts (RMS) or greater.

91. The spark plug of claim 52 wherein said insulator includes an unglazed outer surface having an average roughness of 0.40 micrometers or less.

* * * * *